US006223285B1

(12) United States Patent
Komuro et al.

(10) Patent No.: US 6,223,285 B1
(45) Date of Patent: Apr. 24, 2001

(54) METHOD AND SYSTEM FOR TRANSFERRING INFORMATION USING AN ENCRYPTION MODE INDICATOR

(75) Inventors: Teruyoshi Komuro, Kawasaki; Yoshitomo Osawa, Yokohama, both of (JP); Hisato Shima, Saratoga, CA (US); Tomoyuki Asano, Yokosuka (JP)

(73) Assignees: Sony Corporation of Japan, Tokyo (JP); Sony Electronics, INC, Park Ridge, NJ (US)

( * ) Notice: Subject to any disclaimer, the term of this patent is extended or adjusted under 35 U.S.C. 154(b) by 0 days.

(21) Appl. No.: 08/957,051

(22) Filed: Oct. 24, 1997

(51) Int. Cl.$^7$ .............................. H04L 9/00; H04N 7/167
(52) U.S. Cl. ........................................... 713/160; 380/203
(58) Field of Search .................... 380/21, 48, 49, 380/203, 204; 370/230; 713/200, 201, 160; 705/54, 57

(56) References Cited

U.S. PATENT DOCUMENTS

| 4,598,288 | 7/1986 | Yarbrough et al. | 340/825.34 |
|---|---|---|---|
| 5,070,528 | * 12/1991 | Hawe et al. | 380/48 |
| 5,457,746 | * 10/1995 | Dolphin | 380/4 |
| 5,634,012 | * 5/1997 | Stefik et al. | 395/239 |
| 5,825,891 | * 10/1998 | Levesque et al. | 380/49 |
| 5,828,653 | * 10/1998 | Goss | 370/230 |
| 5,845,283 | * 12/1998 | Williams et al. | 707/1 |
| 5,898,784 | * 8/1999 | Kirby et al. | 380/49 |
| 5,937,066 | * 8/1999 | Gennaro et al. | 380/21 |

FOREIGN PATENT DOCUMENTS

| 0 618723 | * 3/1994 | (EP) | H04N/5/91 |
|---|---|---|---|
| 0 618 723 A1 | 3/1994 | (EP) | H04N/5/91 |
| 0 691 787 A1 | 1/1996 | (EP) | H04N/5/913 |
| 0 763 936 A2 | 3/1997 | (EP) | H04N/5/913 |
| 0 766 466 A2 | 4/1997 | (EP) | H04N/5/913 |
| 0 878 794 A2 | 11/1998 | (EP) | G11B/19/04 |
| WO 97/21279 | 6/1997 | (WO) | H04B/1/69 |

* cited by examiner

Primary Examiner—Gail Hayes
Assistant Examiner—Anthony DiLorenzo
(74) Attorney, Agent, or Firm—Wagner, Murabito & Hao LLP

(57) ABSTRACT

A method and system for transferring information using an encryption mode indicator (EMI). The present invention provides several secure information communication modes in which data (e.g., representing an audio/visual work) can be transmitted from a source device to a sink device (receiving station) in a number of secure modes. In one secure mode, EMI mode A, the information of the transmission is not allowed to be copied as a whole work; this is the highest level of copy protection. In second secure mode, EMI mode B, the information of the transmission is allowed to be copied once and once only by the sink device. In a third transmission mode, no encryption is used and free copying is available. Depending on which secure mode is selected between mode A and mode B, a different encryption process is used by the source device to encrypt the transmission. Further, depending on which secure mode is selected between mode A and mode B, a different decryption process is used by the sink device to decrypt the transmission. The present invention is particularly useful for transmissions between a source device and a bit stream recorder which does not have the capability to extract certain encryption information from a packet header. By using different encryption processes for each transmission mode, an unauthorized device placed between the source and the sink devices that alters the EMI code will be unable to thereafter render or record the audio/visual work because the decryption process selected will differ from the encryption process used.

16 Claims, 10 Drawing Sheets

300

| SERVICE 1 | TRANSMISSION 315 | SECRET1T |
|---|---|---|
| 310 | RECEPTION 317 | SECRET1R |
| SERVICE 2 | TRANSMISSION 325 | SECRET2T |
| 320 | RECEPTION 327 | SECRET2R |
| SERVICE 3 | TRANSMISSION 335 | SECRET3T |
| 330 | RECEPTION 337 | SECRET3R |
| MODE A 340 | | SECRETA |
| MODE B 350 | | SECRETB |

FIGURE 9

METHOD AND SYSTEM FOR TRANSFERRING INFORMATION USING AN ENCRYPTION MODE INDICATOR

BACKGROUND OF THE INVENTION

1. Field of the Invention

The present invention relates to the field of information communication systems. More particularly, the present invention relates to the field of secure communication modes for information representing audio/visual works.

2. Related Art

In recent years, there has been a technique, by which a plurality of audio/visual (AV) devices can be connected using digital interfaces so that AV information (e.g., representing AV works such as movies, songs, etc.) can be transmitted from an information source (e.g., a video disk player or video cassette recorder) to an information display device (e.g., a television set or monitor) or an information sink device. The development of this technology has led to the adoption of the IEEE 1394 serial communication standard for AV devices. Within the IEEE 1394 serial communication standard, information is transmitted in digital packets having certain header information and having data sections.

The AV digital information that is transmitted (e.g., representing movies) is usually protected by a copyright to prevent unauthorized users from viewing the information and making unauthorized reproductions of the AV works. To prevent unauthorized copying, the AV information is transmitted with encoded copy control information called the Copy Control Information (CCI) bits. The CCI bits can also be referred to as Copy Generation Management System (CGMS) bits. The encoded CCI code is made up of 2 bits, of which "00," "10," and "11" indicate "unlimited allowance for copies," "allowance for a single generation copy," and "inhibition of copy," respectively. The "01" bit code is left unused. The manner in which the CCI bits are added to an AV information is specified for the different kinds of AV information (e.g., Motion Picture Expert Group MPEG, Digital Video DV and audio data). These CCI bits are added within the data portion of data packets that constitute the AV information to control the use of the AV information by down stream devices.

At each data recording time, a recording device inspects the CCI code added to the AV information of a packet and refrains from recording them if the CCI code indicates the copy prohibition. If the CCI code indicates the allowance of a single copy, the CCI code is changed to copy prohibition mode and then the AV information is recorded in a recording media once. Thus, the copy generations allowed from the original data are limited.

Moreover, in order to enforce the copy generation limiting system, there has been employed a method by which CCI codes are encrypted into the data portions of the information and the decryption information is licensed to the manufacturer that has made a contract to manufacture only a device conforming to the copy generation limiting system. In order for the recording device to inspect or alter the CCI code encrypted within the AV information, it is necessary to provide a microcomputer mounted on the device or to provide specialized hardware for the processing. In order to match numerous kinds of AV information, the required decryption circuitry is relatively complex, increasing the cost of the device.

For an inexpensive recording device, e.g., a bit stream recording (BSR) device, it is conceivable to manufacture the device without the ability to read the CCI codes within the AV information because the above specialized hardware is eliminated. For this inexpensive BSR device, it has been conceived to provide a unique field within the AV packets to store copy protection information. FIG. 1 illustrates fields of a prior art information packet 10 including a header section 12 in accordance with the IEEE 1394 standard, a packet (CIP) header section 14 and a data field portion 16. The data packet is an isochronous packet. A special bit stream copy control information (BCI) field 20 is included within the CIP header section 14. The BCI field 20 contains the copy protection information for use when AV information is transmitted to a BSR device. Although the data section 16 can contain encrypted data, the CIP header section 14 is typically transmitted without encryption to accommodate the BSR's limited capabilities.

In response to this packet 10, the BSR device inspects the BCI field 20 of the packet header 14 and does not record the data if the packet indicates the copy inhibition, but can record the data if the same indicates the single generation copy allowance or the unlimited allowance. If allowed, the packet information can be recorded by the BSR device together with the BCI code 20 which is stored in the packet header 14. Provided the original packet header indicated the single generation copy allowance, when the recorded information is reproduced and supplied from the BSR device to the IEEE 1394 bus the recovered BCI code 20 will indicate copy inhibition (because it has already copied once). However, the same BCI code is stored and transmitted if the original BCI code indicated no copy limit.

FIG. 2 illustrates a system 30 in which the above copy protection can be compromised by an unauthorized device 34. As shown, a source device 32 transmits information to a sink device 36, which is a BSR device. An intercept device 34 is placed between this communication path (38a and 38b). The BCI code 20 in the packet header 14 can be corrupted by intercept device 34 while the packet is being transmitted from the transmitting device 32 to the receiving device 36. For instance, the transmitting device 32 transmits the BCI code 20 having the bit code "11" indicating the copy prohibition, but it is corrupted (by device 34) during the transmission into the bit code "10" indicating the single generation copy allowance or can be altered to the bit code "00" indicating no copy restriction at all. In response to this packet, the BSR 36 is not informed of the fact that the data intrinsically should inhibit the copy, and records the packet information because the BCI code of the packet header allows a single generation copy or unlimited copies. Therefore, the copy generations cannot be controlled.

Accordingly, what is needed is a copy protection system whereby packet information can be transmitted from a source device to an unintelligent device without compromise by an intermediate device. What is further needed is a copy protection system whereby packet information can be transmitted from a source device to a BSR device without compromise by an intermediate device. What is needed further is a system that does not allow copy protection mode information within a transmission to be altered and yield usable results at the sink device. The present invention provides such advantageous features. These and other advantages of the present invention not specifically mentioned above will become clear within discussions of the present invention presented herein.

SUMMARY OF THE INVENTION

A method and system are described for transferring information using an encryption mode indicator (EMI). The present invention is useful in applications where copy protected information is to be transferred between devices, e.g., in the transmission of audio/visual works that are subject to copyrights. The present invention can be used within the IEEE 1394 serial communication standard in which transmissions comprise individual packets of information.

The present invention provides several secure information communication modes in which data (e.g., representing an audio/visual work) can be transmitted from a source device to a sink device (receiving station) in a number of secure modes. In one secure mode, EMI mode A, the information of the transmission is not allowed to be copied as a whole work; this is the highest level of copy protection. In second secure mode, EMI mode B, the information of the transmission is allowed to be copied once and once only by the sink device. In a third transmission mode, no encryption is used and free copying is available. Depending on which secure mode is selected between mode A and mode B, a different encryption process is used by the source device to encrypt the transmission. Further, depending on which secure mode is selected between mode A and mode B, a different decryption process is used by the sink device to decrypt the transmission. The EMI code therefore indicates both: (1) the copy protection mode of the transmission; and also (2) the encryption process used.

The present invention is particularly useful for transmissions between a source device and a bit stream recorder which does not have the capability to extract copy control information from a packet header. By using different encryption processes for each transmission mode, an unauthorized device placed between the source and the sink devices that alters the EMI code will be unable to thereafter render or record the audio/visual work because the decryption process selected will differ from the encryption process used.

In one embodiment of the present invention, one encryption process is used but two different cipher keys (key A and key B) are used to decrypt the data. In this embodiment, the information is encrypted using a cipher key that is dependent upon the EMI code that is stored in the packet header. If the EMI code is corrupted from mode A to mode B, the sink device will decrypt the transmission by using the key "B." Since the encryption, in this example, is made by means of the key "A," what is obtained by the sink device is a meaningless number. What is recovered at the sink is not the original AV information in the least and are meaningless, even if recorded by the sink device.

BRIEF DESCRIPTION OF THE DRAWINGS

FIG. 2 illustrates a block diagram of a system of the prior art having a source device and a sink device and an unauthorized intermediate device coupled between.

FIG. 9 illustrates operational modes within the present invention.

DETAILED DESCRIPTION OF THE INVENTION

In the following detailed description of the present invention, a method and system for providing secure transmission of copy protected information between a source device and a bit stream recording (BSR) device, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

According to the present invention, the AV packet information is encrypted at the time when the packets are transmitted from the source device, and the cipher mode or encryption process that is used is altered according to an encryption mode indicator (EMI) code. The EMI code of the present invention represents three conditions, a copy prohibition mode, a single generation copy allowance mode and an unrestricted mode. The term "single generation copy" indicates that the original work may allow many copies to be made from it, but a copy of the original (e.g., the one sent to the sink device) can be copied itself only once. The EMI information indicating the selected cipher mode is stored in a packet header. If the EMI information is corrupted on the receiving side, the sink (e.g., receiving) device will be unable to acquire the correct AV information from the packets because the sink device will decrypt in a cipher mode different from the genuine cipher mode. In one embodiment, the cipher mode includes an encryption process, a cipher key, and can include an initial value of a register.

Moreover, depending upon whether the transmitting device and the sink device can understand the EMI information added to the information packet, the individual communications can be classified to use different cipher modes so that the transmitting device and the sink device can recognize the other device.

EMI Secure Communication Modes

Figure 1:
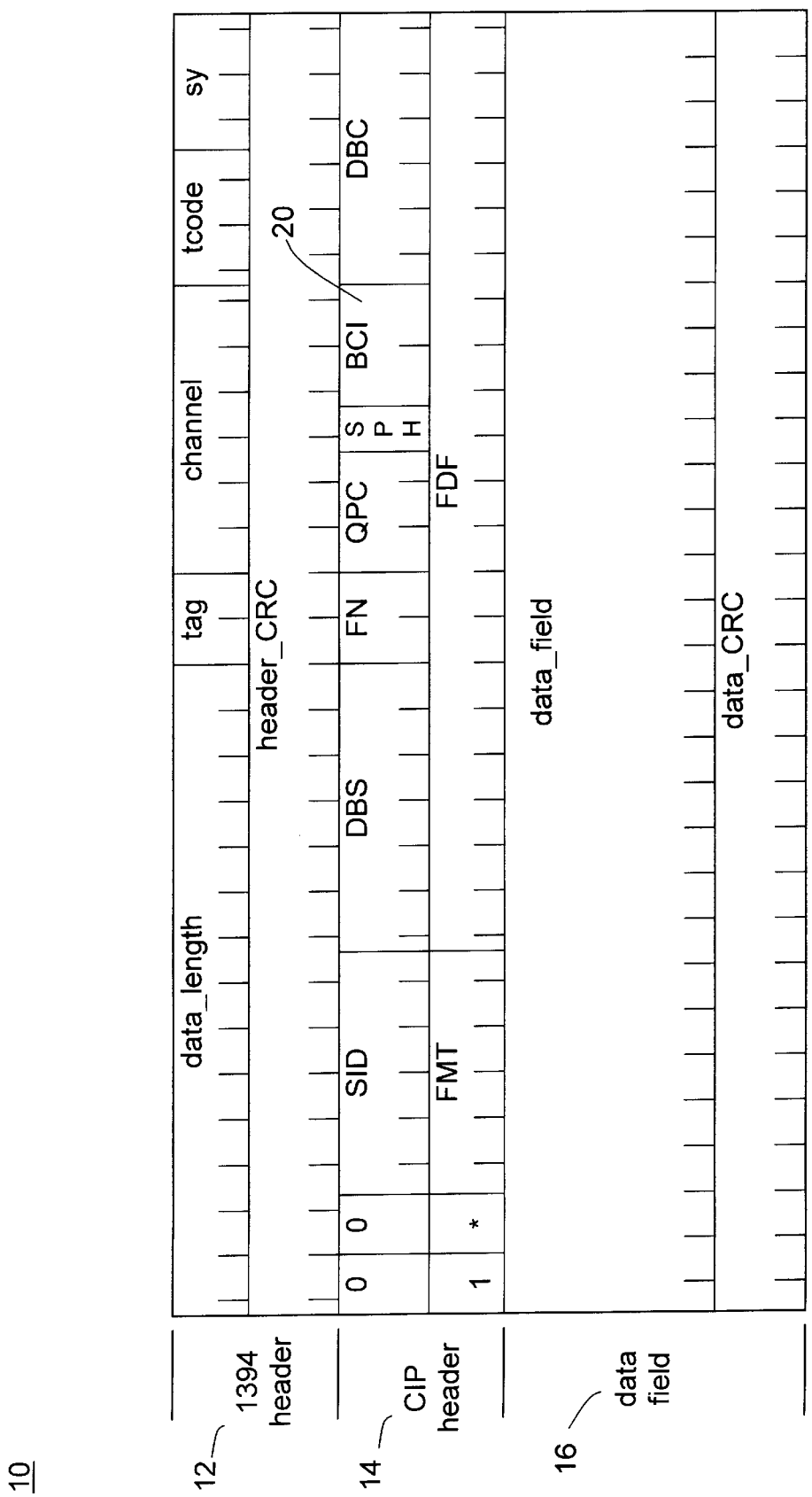
FIG. 1 is an illustration of fields within an information packet according to a copy control information (CCI) interface of the prior art.
Figure 2:
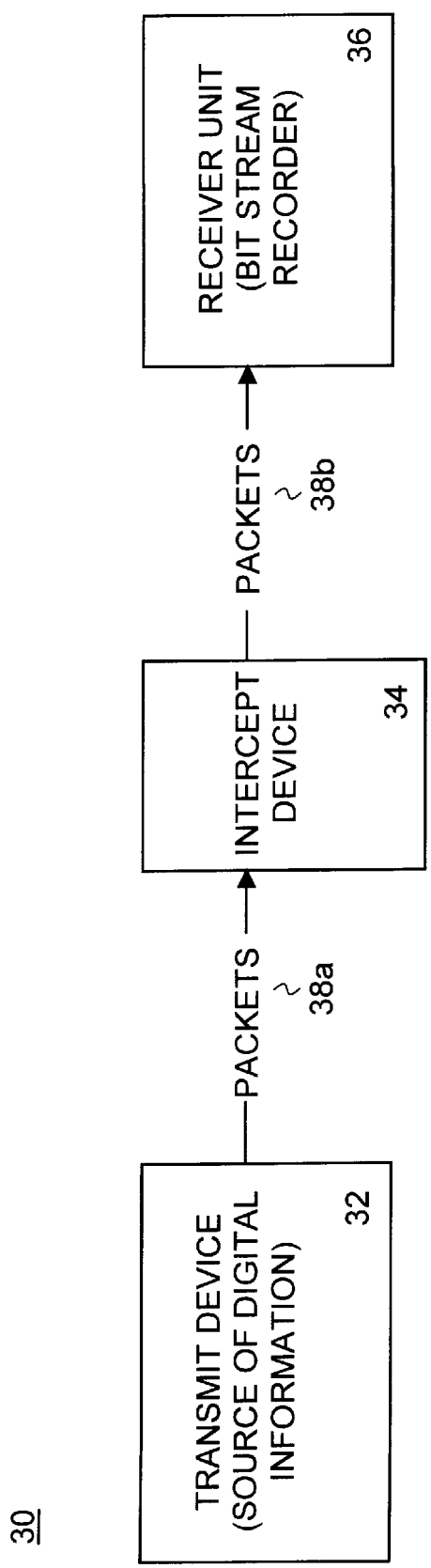
Figure 3:
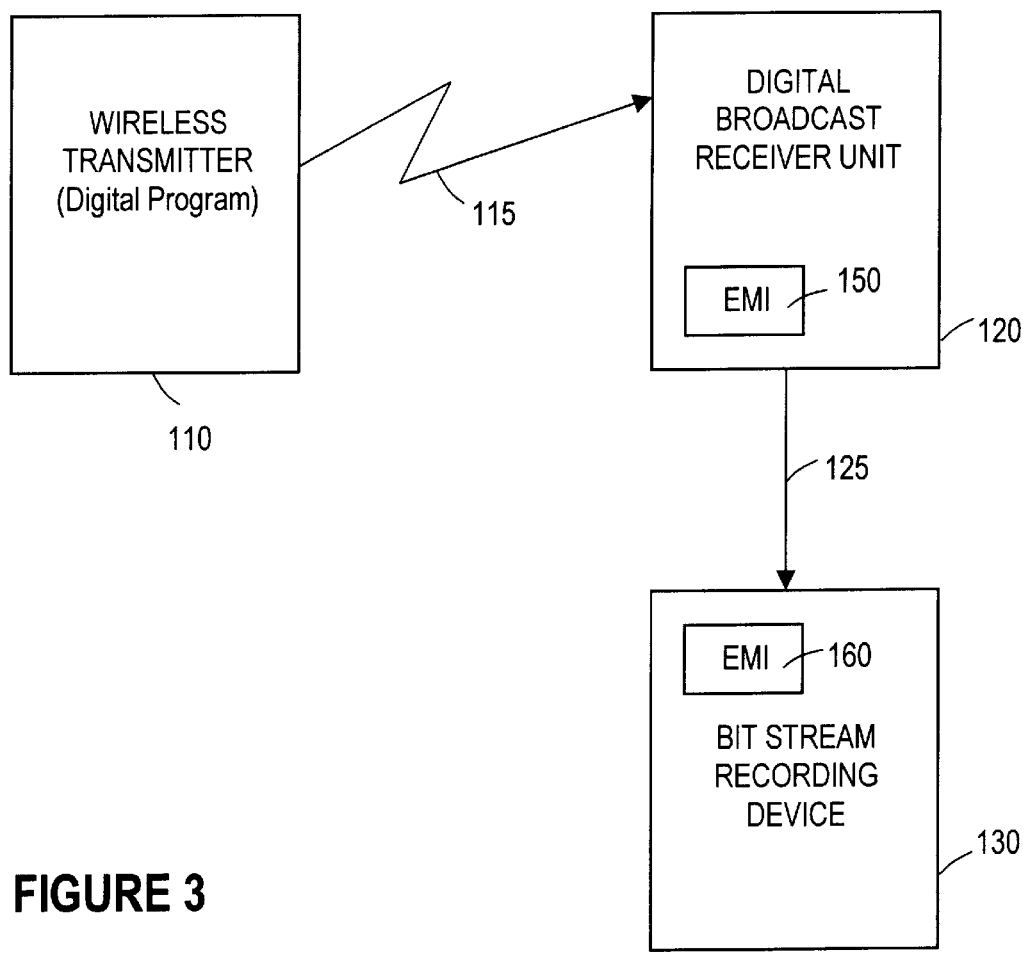
FIG. 3 illustrates a block diagram of one system in accordance with the present invention having a source device and a sink device coupled to communicate an information packet.

FIG. 3 illustrates an exemplary system 100 of the many system configurations that are supported within the present invention. System 100 includes an optional wireless transmitter 110 which is capable of communicating digital AV information representing a digital program via broadcast channel 115. In one embodiment, transmitter 110 can be a satellite broadcast unit. In an alternative embodiment, transmission line 115 is not wireless, but a cable. In this case, transmitter 110 is a land-based transmitter of a cable or pay-TV company.

System 100 also includes a digital broadcast receiver unit 120. This unit 120 can also be called a set top box (STB). Herein, receiver unit 120 is called the source device 120. The source device 120 contains EMI circuitry 150 in accordance with the present invention to support a number of EMI communication modes which are described further below. Circuit 150 utilizes a different encryption mechanism for each EMI encryption mode. The source unit 120 is an intelligent device and contains specialized circuitry for processing copy protection standards. For instance, source unit 120 receives a digital program over channel 115 and this digital program can be encoded using copy control information (CCI information).

System 100 of FIG. 3 also includes a sink device 130, which in this example is a bit stream recorder (BSR) unit 130 and is coupled to the source unit 120 using a serial interface 125. Although shown as a BSR device, sink unit 130 could also be any receiver unit shown in FIG. 8. In many cases, the sink unit 130 is a relatively simple device and, to keep costs down, does not contain the full complement of specialized circuitry required to fully process copy protection standards. For instance, sink unit 130 does not have the ability to decode CCI coded AV information. However, it does contain EMI circuitry 160 in accordance with the present invention. EMI circuitry 160 has the ability to decrypt AV information packets encrypted according to EMI codes. Sink unit 130 is coupled to receive digital information from the source unit 120 over a serial line 125. Digital information is passed over line 125 using the IEEE 1394 communication standard. Moreover, this information is forwarded in digital data packets that contain header information in a header portion and AV information (e.g., data) in a data portion.

Figure 8:
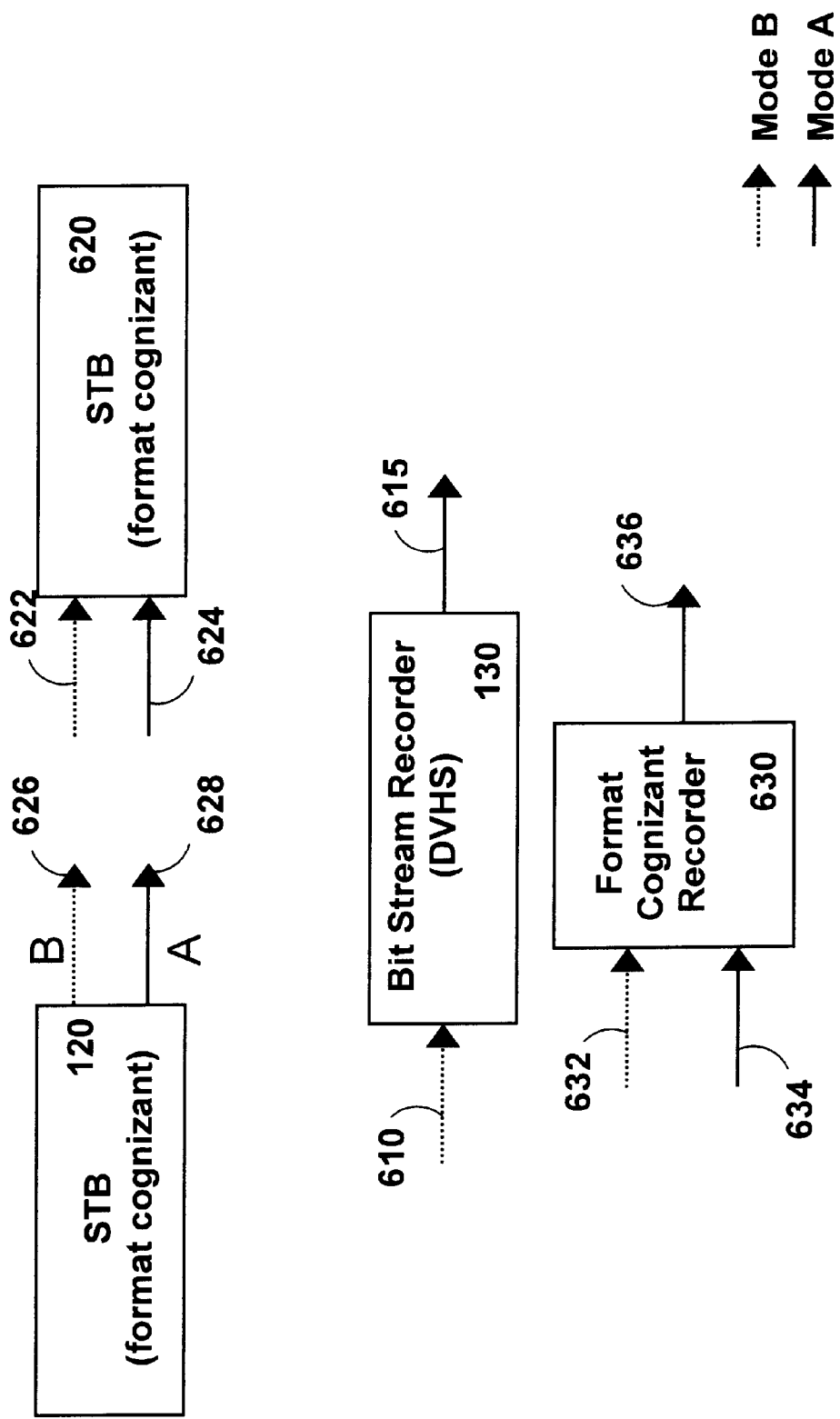
FIG. 8 illustrates different types of audio/visual devices supported by the present invention and the various communication modes supported by input signals to these devices and output signals from these devices.

As described further below, EMI circuits 150 and 160 of FIG. 8 are implemented such that each contains two cipher circuits so that information transmitted over line 125 is encoded under at least two different encryption mechanisms, A and B. In one embodiment, EMI circuit 160 also has two cipher circuits so that it can (if allowed) decrypt information received over line 125 in mode A or in mode B encryption. Rather than using a BCI code, the present invention uses an EMI code placed within data packets of line 125. The EMI code, in addition to indicating the copy protection mode, also advantageously determines the encryption mode used in the data portion of the packet. Therefore, the EMI circuit 160 within the sink unit 130 uses the EMI mode to select the proper decryption mechanism to decrypt the transmission received from line 125. Should be EMI code of the present invention be tampered with between the sink device 120 and the source device 130 (e.g., by an intermediate intercept device), then EMI circuit 160, of the present invention, will select the wrong decryption mode. In this instance, the original transmission will not be obtained by the sink device 130.

There are three kinds of AV information packets which are transmitted over digital interface 125. They is copy free information, copy once information, and copy prohibited information. The streams have different security levels of copy protection in accordance with the present invention. The manner in which copy protection is provided to each packet is called its EMI mode. As described below, in accordance with the present invention the EMI mode also indicates the mode of encryption that is applied to the AV information associated with the EMI mode.

The cipher or EMI modes used in accordance with the present invention are described as follows. EMI mode A is used to indicate that the packet data is copy prohibited. Under this mode A, AV information can only be rendered on a playback device (e.g., TV or monitor), but the AV information is not allowed to be recorded. EMI mode B is used to indicate that the AV information can be copied (e.g., recorded) only one time to allow a single generation copy. This mode B also called single generation copy allowance mode. EMI mode O is used when the AV information has no copy protection and therefore there is no copy limit. Mode O is also called unrestricted mode. For simplicity of description, no encryption is made for the mode O in the present embodiment. In the case of AV information in the copy control state allowing n number of copies (n>1), an extension can be made by defining the modes corresponding to the individual n-copies.

The EMI modes can be represented using a number of well known encoding techniques and can be represented using a register having at least two bits. In one particular embodiment of the present invention, a two bit register is used. Table I below illustrates exemplary coding numbers for each EMI mode. It is appreciated that the coding numbers selected within Table I are exemplary only and that any set of three unique numbers can be used.

TABLE I

| EMI Mode | Two Bit Number | Description |
| --- | --- | --- |
| Mode A | 11 | Copy Prohibition |
| Mode B | 10 | Copy Once |
| Mode O | 00 | No encryption - Unrestricted |
| Reserved | 01 | |

It is appreciated that AV information received over digital interface 125 can include multiple programs. Each program can have its own copy security level. In this case, a copy prohibition stream (code 11) is a stream which includes at least one copy prohibited program. A copy once stream (code 10) is a stream that has no copy prohibited programs and includes at least one copy once program. With the particular example of a BSR sink device 130 (FIG. 3), device 130 is able to record only AV information received in EMI mode B (or EMI mode O) and can only pass through (or reject) AV information received in EMI mode A.

Figure 4:
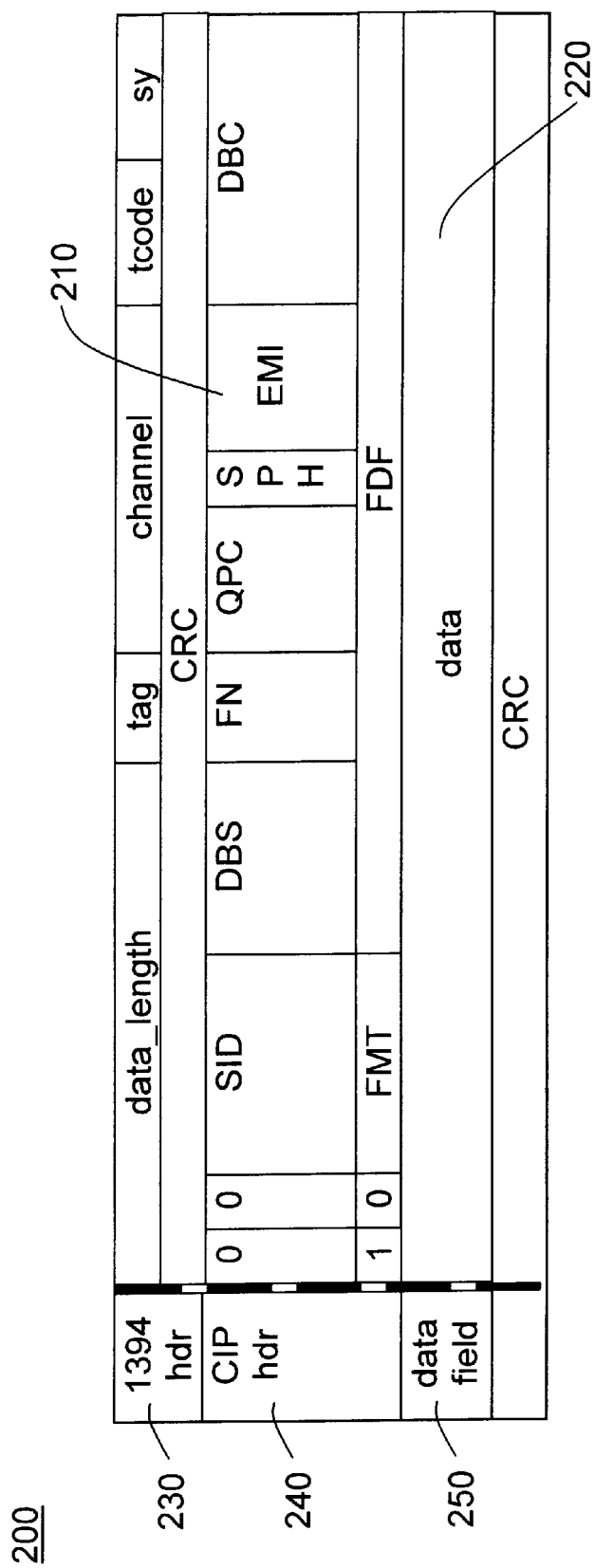
FIG. 4 is an illustration of fields within an information packet including a encryption mode indicator (EMI) in accordance with the present invention including.

FIG. 4 illustrates the fields that constitute a typical information packet 200 in accordance with the present invention that are sent from the source unit 120 to the sink unit 130 (FIG. 3). Information packet 200 of FIG. 4 contains an IEEE 1394 header section 230 because, in one embodiment, the data packets conform to the IEEE communication standard. This header section 230 contains a data_length field, a tag field, a channel field, a tcode field and an sy field. Aside from the tag and tcode fields, header 230 conforms to the well known IEEE standard and the other fields are defined therein. The tag field indicates that the data field starts with a CIP header 240. The tcode field can be one of two predetermined values. It is appreciated that a data stream means a stream of information on one 1394 isochronous channel.

Information packet 200 also contains a CIP header section 240. In accordance with the present invention, the CIP header section 240 contains an EMI field 210 that in one implementation is two bits wide and contains the EMI mode value as defined in Table I. The EMI mode value corresponds to the particular secure communication mode associated with the data of the data field 220 of the section 250.

As described further below, the EMI mode indicated within the EMI field 210 indicates: (1) the particular secure communication mode selected (e.g., mode A, mode B or mode O) and also (2) the particular type of encryption technique used for packet 200. It is appreciated that while the present invention encrypts the data portion 220 of packet 200 (if in EMI mode A or EMI mode B), the header sections 230 and 240 remain unencrypted when transmitted over the IEEE 1394 interface 125 (FIG. 3).

EMI modes within field 210 indicate the copy control status of the data stream on the 1394 isochronous stream. It is important to understand that the data stream in accordance with the present invention can consist of several video and/or audio programs and each of them can have a different copy control information associated with the program. For instance, the MPEG transport stream output from a source unit can contain several programs, each of which can have a different level of copy protection. The source device assigns the EMI value for the most restrictive program in the stream. A bit stream recorder may or may not record the entire stream based on the EMI value. Another type of recording device which is capable of processing each program in the stream individually and is also capable of interpreting copy control information associated with each program is called a format cognizant recording device. A format cognizant recording device refers control information associated with each program to decide its action.

EMI Circuitry of the Present Invention

Figure 5A:
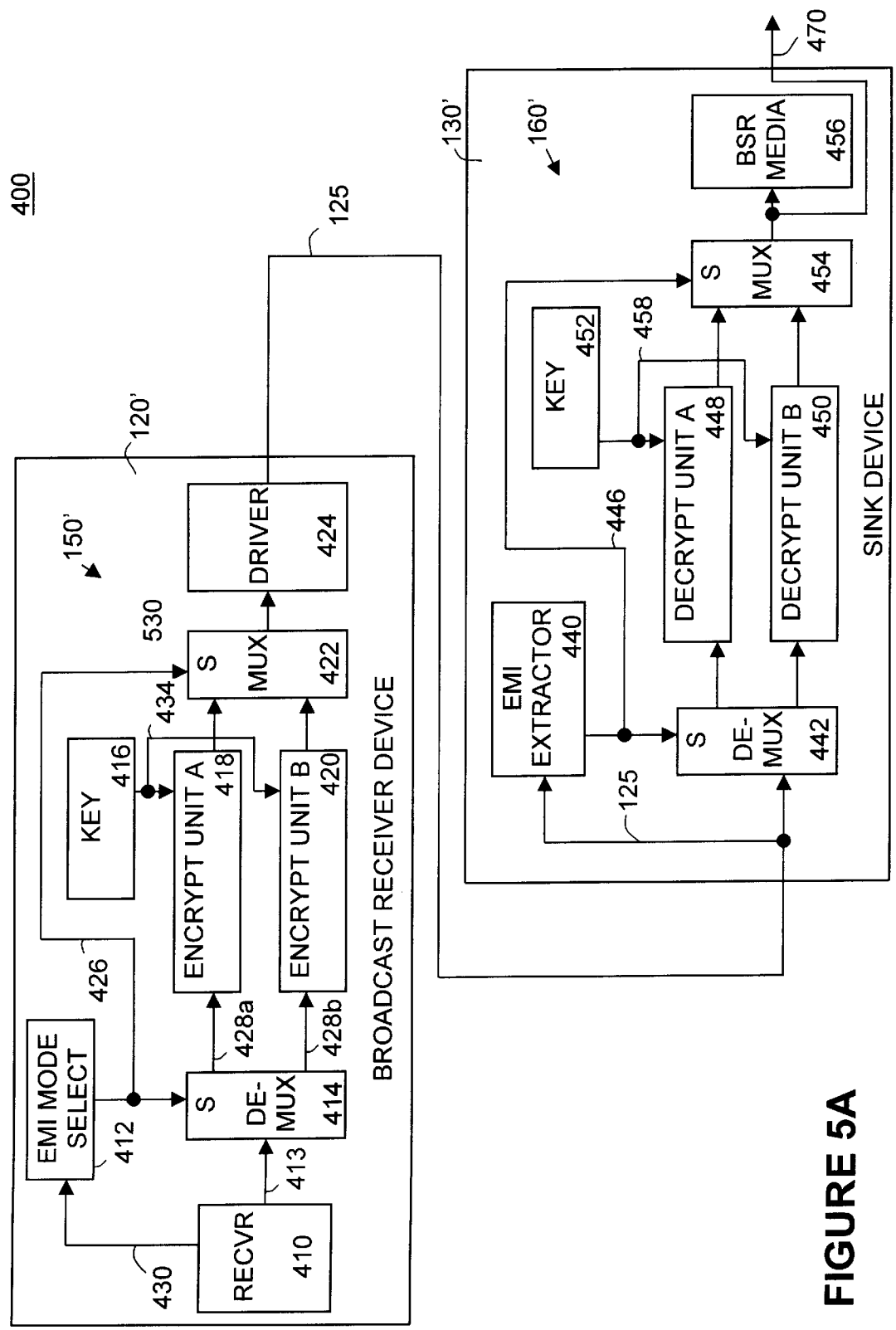
FIG. 5A is a circuit diagram of a source device and a coupled sink device in accordance with a first embodiment of the present invention.

FIG. 5A illustrates a system 400 of the present invention having a source device 120 and a sink device 130. FIG. 5A illustrates the EMI circuitry 150 of a typical source unit 120 in more detail. Source unit 120 can be a set-top-box (STB) unit also called a broadcast receiver which contains many well known circuits (not shown for clarity) in addition to the EMI circuit 150. A receiver circuit 410 receives AV information in the form of data packets and performs any decryption required under CCI standards. The result is forwarded over communication interface 430 and also to a de-multiplexer (de-mux) 414 using interface 413. Circuit 412 is an EMI mode select circuit and depending on the recovered CCI copy protection information will select either EMI mode A or EMI mode B, if copy protection is required. If no copy protection is required, then interface 413 is passed directly to interface 125 and EMI mode O (code "00") is inserted into EMI field 210 of the data packet.

Assuming copy protection is required, select circuit 412 controls de-mux 414 via signals over line 426. If EMI mode A is selected, then the data packet from 413 is routed to encrypt unit A 418 which encrypts the data portion (e.g., field 220) of the data packet according to a cipher key 416 and according to a first encryption technique within encryption unit A 418. Unit 418 also places the "11" code (EMI mode A) within the EMI mode field 210 of the data packet. The result is then passed to multiplexer (mux) 422 which is also controlled by line 426. Mux 422 passes the output from encryption unit A 418 to interface 125 using the optional output driver 424. If EMI mode B is selected, then the data packet from 413 is routed to encrypt unit B 420 which encrypts the data portion (e.g., field 220) of the data packet according to the key 416 and according to a second encryption technique within encryption unit B 420. Unit 420 also places the "10" code (EMI mode B) within the EMI mode field 210 of the data packet. The result is then passed to multiplexer (mux) 422 which is also controlled by line 426. Mux 422 passes the output from encryption unit B 420 to interface 125 using the optional output driver 424. In this embodiment, two different encryption units are used and the encryptions are based on a common key value 416 to provide two encryption mechanisms. As discussed further below, the key 416 can be established during a source-sink authentication process.

Sink device 130 of FIG. 5A contains many well known circuits (not shown for clarity) in addition to EMI circuit 160. EMI circuit 160 within the sink device 130 of FIG. 5A contains a decryption unit A 448 which can decrypt an encryption made by encryption unit A 418, assuming cipher key 452 coincides with key 416 and also contains a decryption unit B 450 which can decrypt an encryption made by encryption unit B 420, assuming key 452 is correct. The data packet of interface 125 is received by a de-multiplexer circuit 442 and also by an EMI mode extractor circuit 440. Circuit 440 extracts the header information from the received data packet and extracts the EMI field 210 from the header. Depending on the EMI mode extracted, circuit 440 controls signals over line 446. If EMI mode O is extracted, then the data packet over line 125 is directly coupled to the bit stream recording media 456 or is allowed to be directly output over line 470 without inhibition.

If circuit 440 extracts EMI mode A, then the data packet from interface 125 is routed through de-mux 442 to decryption unit A 448 which decrypts the data portion of the data packet (using key 452) and forwards the result to mux 454 which is also controlled by select line 446. Mux 454 routes the data packet from the output of decryption unit A 448 to the output line 470 only. When the sink device 130 is a BSR device, it is not allowed to record an EMI mode A data packet, so recording to the BSR media 456 is prohibited in this case. If circuit 440 extracts EMI mode B, then the data packet from interface 125 is routed through de-mux 442 to decryption unit B 450 which decrypts the data portion of the data packet, changes the EMI mode to EMI mode A, records the "11" code (mode A) in the EMI field 210, and forwards the result to mux 454 which is also controlled by select line 446. Mux 454 routes the data packet from the output of decryption unit B 450 to the output line 470 and allows the BSR media 456 to record the data packet, now in EMI mode A. When the sink device 130 is a BSR device, it is allowed to record an EMI mode B data packet only once, so this data packet is changed to an EMI mode A packet prior to recording to the BSR media 456. In this embodiment, two different decryption units are used and the decryption is based on a single cipher key 452.

Figure 6A:
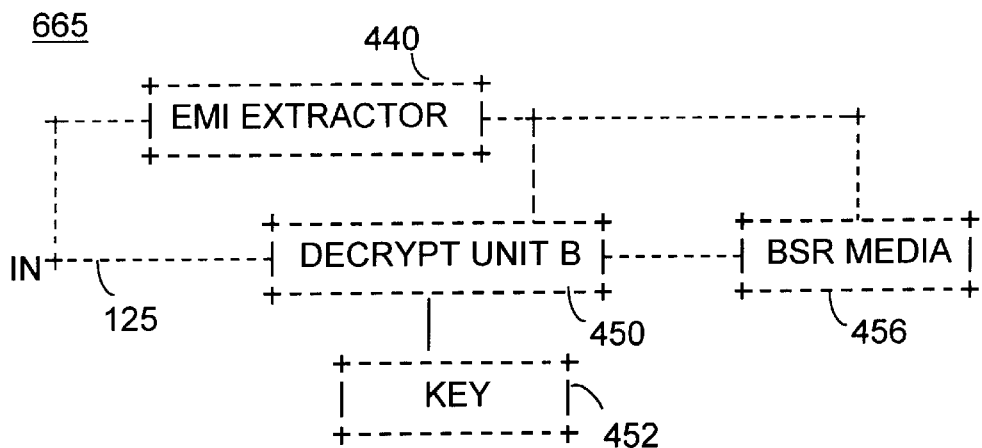
FIG. 6A is a circuit diagram of components of a bit stream recording device in accordance with an alternative implementation of the first embodiment of the present invention.

When the sink device 130 is a bit stream recording (BSR) device, it is not allowed to record EMI mode A encrypted data. Therefore, decrypt unit A for EMI mode A is not implemented in the BSR. FIG. 6A illustrates the block diagram 665 of an alternative embodiment of the EMI circuitry for a bit stream recording sink device 130 without the decrypt unit A. In this embodiment, if the EMI extractor 440 detects mode A in the input 125, it stops the decrypt unit B 450 and stops the BSR recording unit 456.

Circuit 400 of FIG. 5A prevents intermediate devices from compromising the copy protection in the following manner. If an EMI mode A data packet is altered on line 125 to an EMI mode B data packet, the sink device 130 will use the wrong decryption unit when attempting to recover the data. The result becomes meaningless information recorded by BSR media 456. If an EMI mode A or an EMI mode B data packet from interface 125 is altered to an EMI mode O data packet, then sink device 130 will not perform any decryption and the result is not renderable.

Figure 5B:
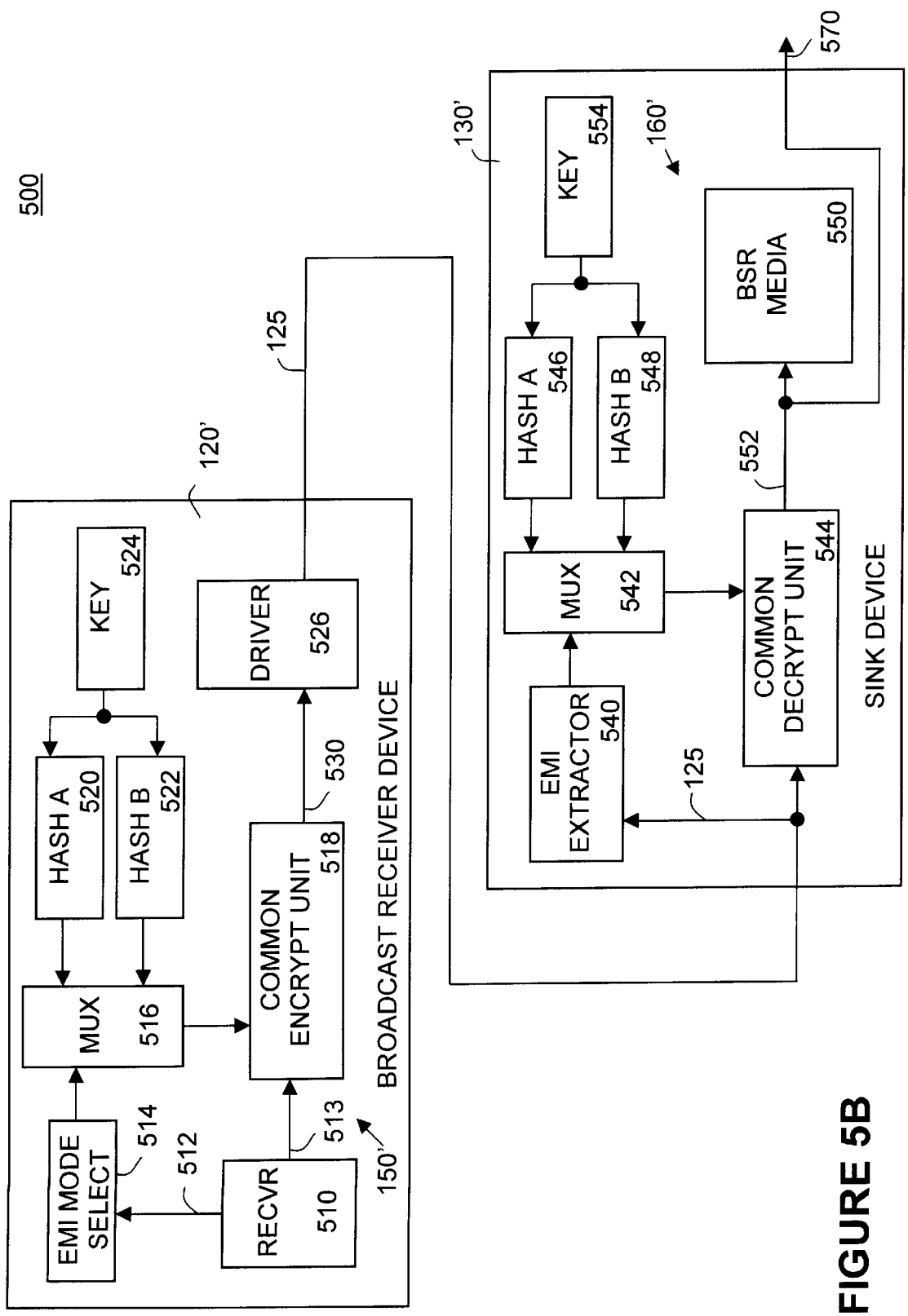
FIG. 5B is a circuit diagram of a source device and a coupled sink device in accordance with a second embodiment of the present invention.

FIG. 5B illustrates a system 500 of the present invention having a source device 120' and a sink device 130'. FIG. 5B illustrates the EMI circuitry 150' of a typical source unit 120' and EMI circuitry 160' of a typical sink unit 130' of an alternative embodiment of the present invention. In this embodiment, a common encryption unit and a common decryption unit are used, but they receive different cipher keys (Key A, Key B) depending on the EMI mode selected; this provides the two encryption-decryption mechanisms.

Source unit 120' of FIG. 5B can be a set-top-box (STB) unit also called a broadcast receiver which contains many well known circuits (not shown for clarity) in addition to EMI circuit 150'. A receiver circuit 510 receives AV information in the form of a data packet and performs any decryption required under CCI standards. The result is forwarded over communication interface 512 (coupled to an EMI mode selected circuit 514) and also to an interface 513. Circuit 514 is an EMI mode select circuit and depending on the recovered CCI copy protection information will select either EMI mode A or EMI mode B, if copy protection is required. If no copy protection is required, then interface 513 is passed directly to interface 125 and EMI mode O (code "00") is inserted into EMI field 210 of the data packet.

Assuming copy protection is required, select circuit 514 controls the select line of multiplexer (mux) 516. Common key 524 is routed to hash circuit A 520 having a first hash function which generates a first cipher key (key A) at its output. Key 524 is also routed to hash circuit B 522 having a second, different, hash function which generates a second cipher key (key B) at its output. If EMI mode A is selected, then mux 516 selects key A to forward to common encryption unit 518 which encrypts the data portion (e.g., field 220) of the data packet according to key A and according to a common encryption technique within encryption unit 518. Unit 518 also places the "11" code (EMI mode A) within the EMI mode field 210 of the data packet. The result is then passed over interface 530 to an optional driver circuit 526 which outputs the data packet to interface 125.

If EMI mode B is selected, then mux 516 of FIG. 5B selects key B to forward to common encryption unit 518 which encrypts the data portion (e.g., field 220) of the data packet according to key B and according to the common encryption technique within encryption unit 518. Unit 518 also places the "10" code (EMI mode B) within the EMI mode field 210 of the data packet. The result is then passed over interface 530 to an optional driver circuit 526 which outputs the data packet to interface 125. In this embodiment, two different keys (A and B) are used to alter the encryption process used in the single common encryption unit 518. As discussed below, the key 524 can be established during a source-sink authentication process. After sharing a covert channel key, Kc, the source device 120' and the sink device 130' share work keys, A and B. First, the source device 120' sends a random number Na to the sink device 130'. The source device and the sink devices use internal EMI circuitry to compute the work keys (Key A and Key B) by:

Key A=HKc(Na||Ca)

Key B=HKc(Na||Cb)

where Hkc a keyed hash function using a key Kc and Ca and Cb are constant and are licensing codes.

Circuit 150' is advantageous because it only requires a single encryption unit 518. Although two hash function circuits 520, 522 are required, this additional circuitry is generally less than the circuitry eliminated by eliminating the second encryption unit. This is particularly true if the hash functions are implemented in software. Hash functions are readily implemented in software because the function needs to be determined only once for a given key.

Sink device 130' of FIG. 5B contains many well known circuits (not shown for clarity) in addition to EMI circuit 160'. EMI circuit 160' within the sink device 130' contains a single common decryption unit 544 which can decrypt an encryption made by common encryption unit 518, assuming the corrected common key is supplied. The data packet of interface 125 is received by an EMI mode extractor circuit 540. Circuit 540, like circuit 440, extracts the header information from the received data packet and extracts the EMI field 210 from the header. Depending on the EMI mode extracted, circuit 540 controls the select line of mux 542. If EMI mode O is extracted by circuit 540, then the data packet over line 125 is directly coupled to the bit stream recording media 550 or is allowed to be directly output over line 570.

Assuming copy protection modes are extracted, EMI extraction circuit 540 controls the select line of multiplexer (mux) 542. Key 554 is routed to hash circuit A 546 having the first hash function which generates the first cipher key (key A) at its output. Key 554 is also routed to hash circuit B 548 having the second, different, hash function which generates the second cipher key (key B) at its output. If EMI mode A is extracted from the data packet, then mux 542 selects key A to forward to common decryption unit 544 which decrypts the data portion (e.g., field 220) of the data packet according to key A and according to a common decryption technique within decryption unit 544. Unit 544 also places the "11" code (EMI mode A) within the EMI mode field 210 of the data packet. The result is routed to the output line 570 only. When the sink device 130' is a BSR device, it is not allowed to record an EMI mode A data packet, so recording to the BSR media 550 is prohibited in this case.

If EMI mode B is extracted by circuit 540, then mux 542 of FIG. 5B selects key B to forward to common decryption unit 544 which decrypts the data portion (e.g., field 220) of the data packet according to key B and according to the common decryption technique within decryption unit 544. Unit 544 also places the "11" code (EMI mode A) within the EMI mode field 210 of the data packet. The result now in EMI mode A is then passed over interface 552 to a BSR recording media 550 and optionally to an output interface 570. When the sink device 130' is a BSR device, it is allowed to record an EMI mode B data packet only once, so this data packet is changed to an EMI mode A packet prior to recording to the BSR media 550. In this embodiment, two different keys (A and B) are used to alter the decryption process used in the single common decryption unit 544. As discussed further below, the key 554 (same as 524) can be established during a source-sink authentication process. Circuit 160' is advantageous because it only requires a single decryption unit 544. Although two hash function circuits 546, 548 are required, this additional circuitry is generally less than the circuitry eliminated by eliminating the second decryption unit. Hash functions 546, 548 are readily implemented in software because the function needs to be determined only once for a given key.

Figure 6B:
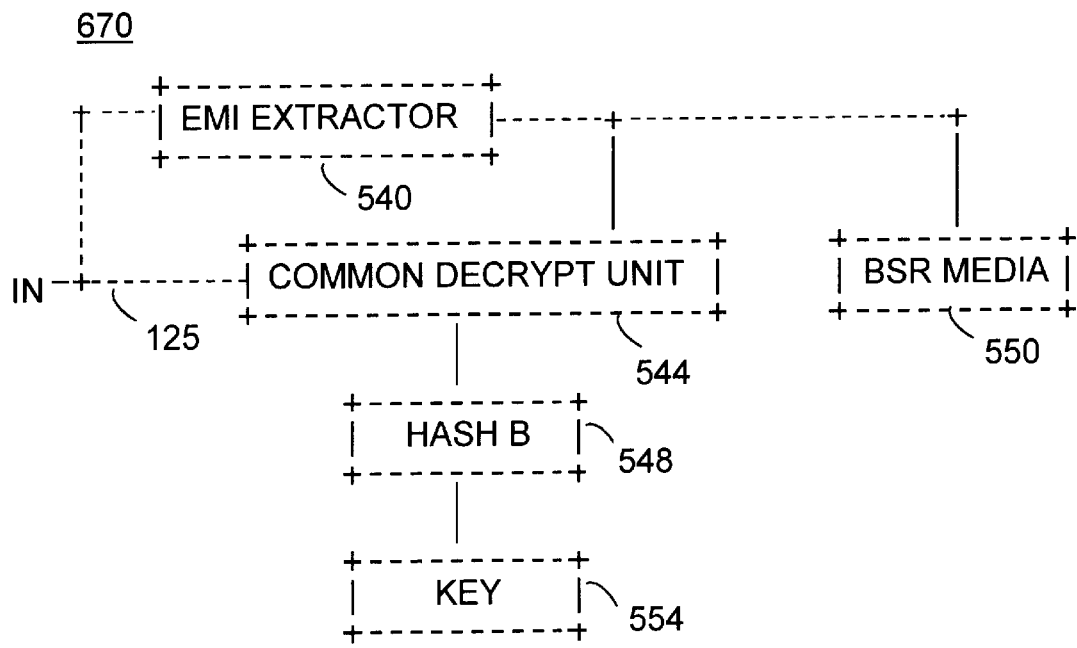
FIG. 6B is a circuit diagram of components of a bit stream recording device in accordance with an alternative implementation of the second embodiment of the present invention.

When the sink device 130' is a bit stream recording (BSR) device, it is not allowed to record EMI mode A encrypted data. Therefore, hash A circuit for EMI mode A is not implemented in the BSR. FIG. 6B illustrates the block diagram 670 of an alternative embodiment of the EMI circuitry for a bit stream recording sink device 130' without the hash A circuit. In this embodiment, if the EMI extractor 540 detects mode A in the input 125, it stops the common decrypt unit 544 and stops the BSR recording unit 550.

Circuit 500 of FIG. 5A prevents intermediate devices from compromising the copy protection in the following manner. If an EMI mode A data packet is altered on line 125 to an EMI mode B data packet, the sink device 130' will use the wrong decryption key (between key A and key B) when attempting to recover the data. The result is meaningless information recorded by BSR media 550. If an EMI mode A or an EMI mode B data packet from interface 125 is altered to an EMI mode O data packet, then sink device 130' will not perform any decryption and the result is not renderable.

Figure 7:
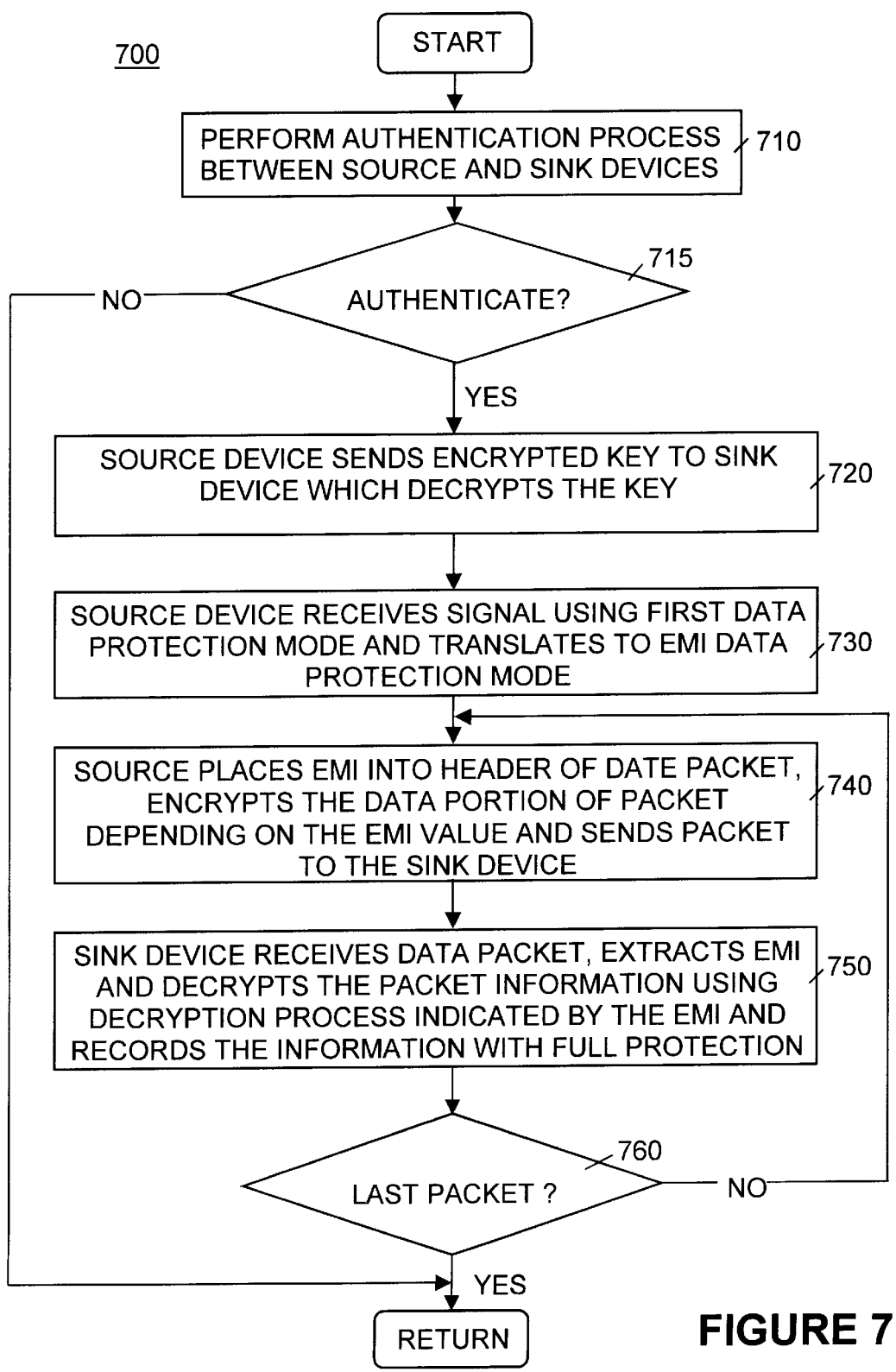
FIG. 7 is a flow chart illustrating steps performed by a source device and a sink device in accordance with the present invention.

FIG. 7 illustrates a flow diagram 700 of steps performed by the present invention with respect to system 400 of FIG. 5A. At step 710, authentication is performed so that sink device and source device recognized each other. This process can be performed using various predetermined license and service keys. Any of a number of well known authentication and secure key exchange processes can be used at step 710 in accordance with the present invention. In the result, special codes are exchanged if authentication was successful and step 720 is entered. If authentication failed, then at step 715, process 700 returns without any AV information exchanged.

At step 720 of FIG. 7, the source device 120 utilizes the special codes to send an encrypted key to the sink device 130 which decrypts the key. At this point, key 416 and key 452 are established between the source and sink devices and these keys are of the same value. At step 730, the source device 120 receives a data packet having a first copy protection mode (e.g., using CCI modes) and translates this CCI mode into an EMI mode (e.g., copy prohibited, copy once, unrestricted). At step 740, the circuit 150 places the proper EMI mode into the header of the received data packet and encrypts the data portion of the data packet using one of two possible encryption mechanisms according to the EMI mode. This data packet is then forwarded over interface 125.

At step 740 of FIG. 7, the since device uses circuit 160 to extract the EMI mode and decrypt the data packet according to the EMI mode that was extracted. One of two possible decryption mechanisms are used based on the EMI mode. This information is recorded in EMI mode A (full protection) if EMI mode B was received. If EMI mode A was received, then no recording is allowed. At step 760, if more data packets are required, then process 700 returns to step 740 to process the next data packet. Otherwise, process 700 returns.

The operational procedure of the alternative embodiment of FIG. 5B is similar to the above except different keys are used to provide the different encryption and decryption mechanisms of FIG. 5B.

Classification of Devices in Accordance with the Present Invention

FIG. 8 illustrates a number of different classes of devices that can be used in accordance with the present invention. Also shown in FIG. 8 are the types of AV information packets (classified by EMI mode) that can be received and transmitted by each device. The dotted signal lines represent AV information packets in EMI mode B and the solid signal lines represent AV information packets in EMI mode A.

The first device class is device class A. These devices include transmitting devices that can add the EMI code to their packet information and also include those devices that can receive CCI data. An example is a set-box (STB) 120 which is able to receive a satellite broadcast (e.g., in CCI format) and transmit the data over the IEEE 1394 bus. As shown in FIG. 8, the STB device 120 can generate AV transmission packets encrypted under either EMI mode A or EMI mode B. The STD device 120 can also generate AV transmissions that are unrestricted. Device 120 supplies AV information in EMI mode B as shown by output 626 and in EMI mode A as shown by output 628.

The second device class is device class B. These devices include receiving or sink devices that are capable of responding to the EMI information that is present within AV information packets. An example device within class B is the format cognizant recorder device 630. This device 630 is able to properly decrypt the received AV information packets in any EMI mode, record the AV information using the IEEE 1394 standard format, record the EMI information added thereto and transmit the reproduced data using the IEEE 1394 standard format. If the AV information received is originated in EMI mode B, when recorded it is altered to EMI mode A to prevent further copies. Device 630 is able to receive AV information packets encrypted in EMI mode B 632 and in EMI mode A 634 but only can supply AV information encrypted in EMI mode A 636.

The third device class is device class C. These devices include receiving devices that are incapable of fully processing certain copy protection information (e.g., under CCI modes) because these devices lack the specialized circuitry required to fully process this copy protection information. One example of class C is the bit stream recorder (BSR) device 130 of FIG. 8. It is capable of receiving only AV information encrypted in EMI mode B via input 610 and is capable of supplying only AV information encrypted in EMI mode A via output 615. The BSR device 130 is capable of decrypting mode B encryption using the extracted EMI code and storing this information, if EMI mode B is received. The BSR device 130 can also reproduce AV information and transmit this information in EMI mode A under the IEEE 1394 standard.

The fourth device class is device class D. These devices include receiving devices that can process EMI information which is added to the information packets. An example of a class D device is digital television 620. The digital TV set 620 is able to receive AV information encrypted in EMl mode B via input 622 and encrypted in EMI mode A via input 624, under the IEEE 1394 standard. The digital TV 620 is able to decrypt AV information from either EMI mode A or EMI mode B and render the AV information.

Encryption and decryption modes can be licensed by an entity depending on the functions which the entity wants to achieve. If the entity manufactures display devices, licenses for decryption of EMI mode A and EMI mode B are necessary. If the entity manufactures a BSR unit 130, decryption of EMI mode B and encryption for EMI mode A are necessary. EMI modes A and B can be combined with license keys and service keys, as described below with respect to one embodiment of the present invention.

Exemplary Service Classifications in Accordance with One Embodiment of the Present Invention In one embodiment of the present invention, particular communication services are supported. In this embodiment, particular secrets (e.g., key codes) are defined depending on the type of service used and whether a device is a source or sink device. According to the above classifications of the transmitting devices and the receiving devices, the following indicates service classifications for data transmissions. Transmissions within service 1 include transmitting devices of Classes A, B, or C with receiving devices of Classes A, B, or C. Transmissions within service 2 include transmitting devices of Classes A, B, or C with receiving devices of Class D. Transmissions within service 3 include transmitting devices of Class D with receiving Devices of Classes A, B, or C.

Generally, under service 1, a source unit which recognizes CCI copy protection format sends AV information to a sink unit which also recognizes this CCI format (e.g., STD→display, or, STB→format cognizant recorder). Both source and sink are copy protection intelligent devices. Under service 2, a source unit which recognizes the CCI format sends AV information to a sink unit which does not recognize CCI format but is implemented to recognize the EMI codes in accordance with the present invention (e.g., STB→BSR unit). The sink unit does not have the same level of copy protection intelligence as the source unit. Under service 3, a source unit that does not recognize CCI format sends AV information to a sink unit that recognizes CCI format (e.g., DVHS→Display).

In one embodiment of the present invention, secret codes (e.g., key codes) for using the EMI modes A and B and the services 1, 2, and 3 are given (e.g., licensed) to the devices of the individual classes enumerated above. A key code or "secret" is used by the two devices for performing secure key transmissions during authentication, as described above. In this manner, the keys that are described above and used for encryption and decryption can safely be transmitted between the source and sink devices.

In the services 1, 2, and 3, different key codes are necessary for the transmitting devices and the receiving devices. For example, the key code for the transmitting device of the service 1 is different from the key code for the receiving device. Described here is the manner that the key codes are provided to the individual devices. According to the table of FIG. 9, there are eight key codes used in this embodiment of the present embodiment. The device classifications can be further refined according to types of data such as MPEG or DV. A pair including a service key and a license key is allocated to services 1, 2, and 3, respectively. A source unit has a service key and a sink unit has the licensed key corresponding to its supported services. Therefore, services 1, 2 and 3 are distinguished by service key or license key.

For example, STB unit 120 can give service 1, 2 so STB unit 120 has service key 1 and 2. The DVHS 130 can receive service 2 and give service 3 so DVHS 130 has license key 2 and service key 3. Each service can be divided into sub services within it own service group. A set of encryption mode(s), service mode(s) and license key(s) is given to a unit depending on the functions the device should have. For instance, a display device 620 could have decryption EMI mode A and EMI mode B and license keys for services 1 and 3. The STB unit 120 could have encryption for EMI mode A and EMI mode B and service keys for service 1 and service 2. The DVHS (BSR) unit 130 could have decryption for EMI mode B, encryption for EMI mode A and license key for service 2 and service key for service 3.

According to FIG. 9, the devices of Class A are required to have key codes for the transmitting devices of services 1 and 2 and key codes for EMI modes A and B and are provided key codes: Secret 1T; Secret 1T; Secret 2T; Secret 2T; Secret A; and Secret B. Likewise, the devices of Class B are required to have key codes for the receiving devices of service 1 and 3, a key code for the transmitting device of Service 1, and key codes for Modes A and B, and are provided key codes: Secret 1R; Secret 1R; Secret 3R; Secret 3R, Secret A; and Secret B. The devices of Class C are required to have key codes for the receiving devices of Services 1 and 3 and key codes for Modes A and B and are provided key codes: Secret 1R; Secret 1R; Secret 3R; Secret 3R; Secret A; and Secret B. The devices of Class D are required to have a key code for the receiving device of Service 2 and a key code for the transmitting device of Service 3 and are provided key codes: Secret 2R; Secret 3T; Secret A; and Secret B. Typically, the use of Mode A only for the transmissions and the use of Mode B only for the receptions is required.

Operation of Present Invention Using Service Keys

The following procedure describes the manner in which data packets are transmitted from a source device of class A to a sink device of class B acting as a receiving device. The data packets are transmitted from source device to sink device and are recorded by the sink device.

The source device at the transmission side generates Kseed as a data key for encrypting the data packets. The source device safely delivers the data key Kseed to the sink device at the reception side using the secrets Secret 1T and Secret 1R for the transmitting device and the receiving device of Service 1. Next, the source device makes an encryption Key A for Mode A and a cipher Key B for Mode B by employing Kseed, Secret A, and Secret B. Specifically, calculations are made by using:

Key A=h (Kseed∥Secret A)

Key B=h (Kseed∥Secret B).

Where letter h designates the hash function, and the expression a∥b designate a bit connection of a and b.

The source device reads the value of the CCI added to the data to be transmitted. If the CCI indicates the copy inhibition, the data packet is encrypted together with the CCI by means of the cipher Key A for Mode A. The EMI mode ("11") is stored in field 210 and the data packet is transmitted over the IEEE 1394 interface. If the CCI indicates the single generation copy allowance, the data are encrypted together with the CCI by means of the cipher key B for Mode B, and the EMI mode ("10") is stored and packeted in the EMI mode field 210 of the data packet and the packet is transmitted over the IEEE 1394 interface. If the CCI indicates no copy limit, the data packet is not encrypted but packeted. The EMI mode is stored as "00," in field 210 and the packet is transmitted. Therefore, what key the transmitting device uses to encrypt the data does not depend upon the service but is determined by the EMI mode added to the data.

Like the source device, the sink device generates Key A and Key B from Kseed, Secret A, and Secret B. The EMI of the received packet is inspected by the sink device, and the data is decrypted by using the key A, if the EMI mode indicates Mode A, and by using key B if the EMI mode indicates Mode B. Next, the EMI mode added to the decrypted data is inspected. The data are not recorded if the EMI mode indicates the copy inhibition. The EMI mode is changed, if it indicates the single generation copy allowance, into the copy inhibition and is recorded together with the data. The EMI mode is recorded together with the data, if it indicates no copy limit.

Described next is the processing for the case the transmitting device is the of class a whereas the receiving device is of class d. As in the foregoing procedure, the source device delivers the Kseed safely to the sink device. However, the secrets to be used here are Secret 2T and Secret 2R. The source device generates the keys Key A and Key B, as described above, and encrypts the data in dependence upon the EMI mode added to the data. The source device stores the proper EMI in the packet header and transmits it.

The sink device generates the key B in a manner similar to that of source device. Assume the sink device is inhibited to use Mode A for receptions by the license conditions so that it does not generate key A. The sink device inspects the EMI mode of the received packet. The sink device discards the packet if the EMI mode indicates Mode A. If the EMI mode indicates Mode B, the sink device decrypts the data by means of the key B and records the packets. At this time, the information indicating that the data have been encrypted in mode B is recorded together with the data. If the EMI mode indicates 00, the sink device records the data as they are. At this time, the information indicating that the data have not been encrypted is recorded together with the data.

The preferred embodiment of the present invention, a method and system for providing secure transmission of copy protected information between a source device and a bit stream recording (BSR) device, is thus described. While the present invention has been described in particular embodiments, it should be appreciated that the present invention should not be construed as limited by such embodiments, but rather construed according to the below claims.

What is claimed is:

1. A system for transferring information, said system comprising:
   a source device for encoding an encryption mode identifier (EMI) code into an information packet and for transmitting said information packet over a communication interface, said source device comprising:
      a first encryption circuit for encrypting data of said information packet provided said EMI code indicates a first mode; and
      a second encryption circuit for encrypting said data of said information packet provided said EMI code indicates a second mode; and
   a sink device for receiving said information packet from said communication interface, said sink device comprising:
      an extractor circuit for extracting said EMI code from said information packet; and
      a first decryption circuit for decrypting said data of said information packet in response to said extractor circuit indicating that said EMI code is of said first mode; and
      a second decryption circuit for decrypting said data of said information packet in response to said extractor circuit indicating that said EMI code is of said second mode; and
   wherein said first mode is a copy prohibition mode indicating that said information packet is not to be reproduced by said sink device and wherein said second mode is a copy once inhibition mode indicating that said information packet is not to be reproduced more than once by said sink device; and
   wherein said first encryption circuit, said second encryption circuit, said first decryption circuit and said second decryption circuit are coupled to receive a same cipher key.

2. A system as described in claim 1 wherein said sink device is a bit stream recording device and wherein said sink device further comprises a recording media for recording said information packet provided said EMI code is of said second mode and wherein said EMI code of said information packet is altered to said first mode by said sink device upon recording onto said recording media.

3. A system as described in claim 1 wherein said communication interface is a serial communication interface conforming to the IEEE 1394 communication standard and wherein said information packet is a digital information packet.

4. A system as described in claim 1 wherein said source device is a broadcast receiver device and further comprises a receiver circuit for receiving an information packet encoded with CCI information and for extracting a copy protection code therefrom and wherein said sink device is unable to process an information packet encoded with CCI information.

5. A system as described in claim 1 wherein said information packet represents a portion of a digital audio/visual program.

6. A system for transferring information, said system comprising:
   a source device for encoding an encryption mode identifier (EMI) code into an information packet and for transmitting said information packet over a communication interface, said source device comprising:
      a common encryption circuit for encrypting data of said information packet based on a first key if said EMI code indicates a first mode, and wherein said common encryption circuit is also for encrypting data of said information packet based on a second key if said EMI code indicates a second mode; and
   a sink device for receiving said information packet from said communication interface, said sink device comprising:
      an extractor circuit for extracting said EMI code from said information packet; and
      a common decryption circuit is for decrypting said data of said information packet using said second key in response to said extractor circuit indicating that said EMI code is of said second mode; and
   wherein said first mode is a copy prohibition mode indicating that said information packet is not to be reproduced by said sink device and wherein said second mode is a copy once inhibition mode indicating that said information packet is not to be reproduced more than once by said sink device; and
   wherein said common decryption circuit of said sink device is also for decrypting said data of said information packet using said first key in response to said extractor circuit indicating that said EMI code is of said first mode; and
   wherein said source device and said sink device each comprise:
      a first hash circuit for generating said first key based on a common key; and
      a second hash circuit for generating said second key based on said common key and wherein said common key is transferred between said sink device and said source device before said information packet is received by said sink device.

7. A system as described in claim 6 wherein said sink device is a bit stream recording device and wherein said sink device further comprises a recording media for recording said information packet provided said EMI code is of said second mode and wherein said EMI code of said information packet is altered to said first mode by said sink device upon recording onto said recording media.

8. A system as described in claim 6 wherein said common decryption circuit of said sink device is also for decrypting said data of said information packet using said first key in response to said extractor circuit indicating that said EMI code is of said first mode.

9. A system as described in claim 8 wherein said communication interface is a serial communication interface conforming to the IEEE 1394 communication standard and wherein said information packet is a digital information packet.

10. A system as described in claim 8 wherein said source device is a broadcast receiver device and further comprises a receiver circuit for receiving an information packet encoded with CCI information and extracting a copy protection code therefrom and wherein said sink device is unable to process an information packet encoded with CCI information.

11. A system as described in claim 8 wherein said information packet represents a portion of a digital audio/visual program.

12. A system for transferring information, said system comprising:

a means for encoding an encryption mode identifier (EMI) code into an information packet and for transmitting said information packet over a communication interface, said means comprising:

a first means for encrypting data of said information packet provided said EMI code indicates a first mode; and a second means for encrypting said data of said information packet provided said EMI code indicates a second mode; and a sink device for receiving said information packet from said communication interface, said sink device comprising:

a means for extracting said EMI code from said information packet; and a first means for decrypting said data of said information packet in response to said means for extracting indicating that said EMI code is of said first mode; and a second means for decrypting said data of said information packet in response to said means for extracting indicating that said EMI code is of said second mode; and wherein said first mode is a copy prohibition mode indicating that said information packet is not to be reproduced by said sink device and wherein said second mode is a copy once inhibition mode indicating that said information packet is not to be reproduced more than once by said sink device; and wherein said first means for encryption, said second means for encryption, said first means for decryption and said second means for decryption are coupled to receive a same cipher key.

13. A system as described in claim 12 wherein said sink device is a bit stream recording device and wherein said sink device further comprises a recording media for recording said information packet provided said EMI code is of said second mode and wherein said EMI code of said information packet is altered to said first mode by said sink device upon recording onto said recording media.

14. A system as described in claim 12 wherein said communication interface is a serial communication interface conforming to the IEEE 1394 communication standard and wherein said information packet is a digital information packet.

15. A system as described in claim 12 wherein said source device is a broadcast receiver device and further comprises a receiver circuit for receiving an information packet encoded with CCI information and for extracting a copy protection code therefrom and wherein said sink device is unable to process an information packet encoded with CCI information.

16. A system as described in claim 12 wherein said information packet represents a portion of a digital audio/visual program.

* * * * *